Jan. 17, 1961 H. BACHMANN ET AL 2,968,438
SLIDE RULES
Filed Aug. 9, 1956 2 Sheets-Sheet 1

INVENTORS
Harald Bachmann and
Heinrich Tegtmeyer
By Em. D. Frankel
Patent Agent

Jan. 17, 1961 H. BACHMANN ET AL 2,968,438
SLIDE RULES
Filed Aug. 9, 1956 2 Sheets-Sheet 2

INVENTORS
Harald Bachmann and
Heinrich Tegtmeyer
By Eric D. Frankel
Patent Agent

United States Patent Office 2,968,438
Patented Jan. 17, 1961

2,968,438

SLIDE RULES

Harald Bachmann, Stein, near Nurnberg, and Heinrich Tegtmeyer, Geroldsgrun, Germany, assignors to A. W. Faber-Castell, Stein, Germany, a firm of Germany Filed Aug. 9, 1956, Ser. No. 602,967

Claims priority, application Germany Sept. 2, 1955

9 Claims. (Cl. 235—70)

The present invention relates to new improvements in slide rules, and more particularly in the slides for double slide rules which consist of two bracketlike parts which are facing toward the opposite sides of the slide rule and are adjustable within certain limits relative to each other in the longitudinal direction so as to permit the graduations thereon to be accurately aligned with the graduations on the respective side of the slide rule.

In one slide rule of the mentioned type, as known prior to this invention, each of the narrow sides of the slide is provided with two screws which connect the overlapping portions of the slide brackets with each other. The apertures for receiving these screws are elongated to form longitudinal slots, within the limits of which the two brackets may be adjusted relative to each other for proper alignment of each bracket with the graduations on the respective side of the slide rule after the screws have been loosened. If, however, it should be necessary to clean the slide at the inside facing toward the slide rule, it will be necessary to remove all four screws entirely. Apart from the fact that the small screws may then be easily lost, such disassembly and subsequent reassembly requires a certain mechanical aptitude, as well as considerable time. Therefore, most users, not wishing to interrupt their work, prefer to work with a dirty slide through which they can hardly see, rather than take the time to unscrew, clean, and then reassemble the slide, and after that to readjust each time the two slide brackets so as to be in proper alignment with the graduations on the respective sides of the slide rule.

It is therefore an object of the present invention to provide new means for facilitating the removal of the slide from the slide rule and its remounting thereon, as well as the adjustment of the two slide brackets relative to each other, and for permitting all these steps to be carried out within a very short time.

A feature of the invention for accomplishing this object consists in providing the two brackets forming the slide with suitable interengaging means which are disposed within the overlapping portions of the two brackets, and which securely connect the latter to each other at least in the direction transverse to the slide rule. These interengaging means preferably consist of at least one flange at each longitudinal narrow side of one slide bracket and extending at an angle thereto and provided with a longitudinally extending tongue or groove therein, and another angular flange at each longitudinal side of the other slide bracket with a corresponding groove or tongue thereon. Thus, the connecting or overlapping portions at least at one side of the brackets form a keyway on one bracket which slidably overlaps and engages with a corresponding keyway on the other bracket. The interengaging keyways are preferably made of triangular cross-sectional shape since such inclined surfaces facilitate the engagement with or removal from each other. For this purpose, the two slide brackets are preferably made of resilient material, for example, a suitable plastic, so as to permit the projecting flanges on each bracket or the brackets themselves to be slightly bent away from each other so that the flanges may then be easily engaged with or disengaged from each other. The two brackets may thus be simply snapped together and will then be securely keyed to each other, whereupon they may then be shifted longitudinally of each other for their proper adjustment relative to the graduations on the slide rule.

For locking the two slide brackets in the properly adjusted position, the inner one of the two flanges at one side of the two brackets according to one preferred embodiment of the invention is provided with a screw substantially at the center of its length, while the outer or overlapping flange of the other bracket is provided with a longitudinal slot and a central cutout extending from such slot to the free longitudinal edge of the flange facing toward the first bracket. This slot is thus substantially T-shaped, the central cutout permitting the shaft of the screw on the other bracket to be inserted into or withdrawn from the longitudinal slot. If the slide brackets are to be removed from the slide rule in order to be cleaned, it is therefore not necessary to remove the single screw entirely but only to loosen it sufficiently to unsnap the two interengaging flanges at that side of the brackets so that the screw shaft can then slip through the cutout.

This embodiment of the invention has the advantage of an easy removal and reassembly of the slide. However, it requires a new adjustment of the slide brackets after every cleaning operation. In order to avoid such repeated adjustments, it is another feature of the invention to provide a separate striplike key between the two brackets which connects the latter and is slidable longitudinally along the one narrow side of one bracket and adapted to be secured thereto in a certain adjusted position by a pair of screws. This key is of a shape so as to cooperate and engage with the tongue or groove on the other bracket. According to another modification of the invention, the tongue on this key is split up into two tongue sections which are spaced a certain distance from each other so as to form an intermediate gap. The other bracket is then provided with a projection which is adapted to engage into this gap without lateral play so that, after the brackets are assembled, they may be shifted laterally relative to each other only after the screws, which are guided in longitudinal slots, are loosened. If the screws which are connected to the key are shifted laterally within the slots, such movement will also shift the other bracket due to the fact that it is secured to the key both in the transverse and longitudinal directions. After the graduations on the slide brackets have been properly aligned with those on the slide rule, the screws are again tightened. Thereafter, the slide may be taken apart as often as desired without requiring any new adjustment, since the projection on the one bracket engages into the gap between the two tongue sections on the key which is secured to the other bracket.

A further modification of the invention consists in providing the tongue-and-groove joint merely at one narrow side of the slide, and in connecting the two brackets by means of a pair of screws which are slidable in slots in the other side of the brackets. If such a slide needs cleaning, it is only necessary to pull the two brackets apart at the side of the tongue-and-groove joint in order to slip the entire slide over and from the slide rule.

The two last-mentioned embodiments therefore permit the brackets to be easily adjusted relative to each other, and also the entire slide to be very easily removed from or remounted on the slide rule. It is thus no longer necessary to loosen the screws or to readjust the slide after it has been cleaned since the relative position of the two brackets remains unchanged.

An additional feature of the invention consists in the provision of a notch at a certain point on the two brackets in order to facilitate the manipulation of removing the slide from the slide rule. The two slide brackets may then be more easily separated by inserting some kind of pointed tool, for example, a finger nail, in such notch.

Further objects, features, and advantages of the present invention will appear from the following detailed description thereof which is to be read with reference to the accompanying drawings, in which—

Fig. 9 shows a view as taken from the top of Fig. 7; while

Figure 1:
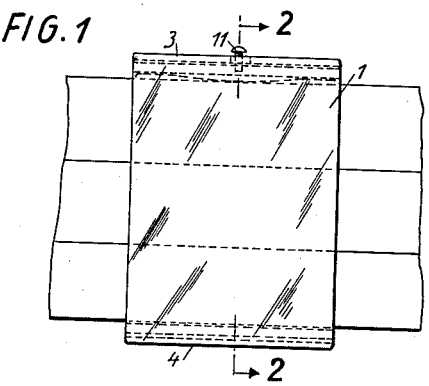
Fig. 1 shows a plan view of a portion of a double slide rule with the slide according to the invention being mounted thereon.
Figure 2:
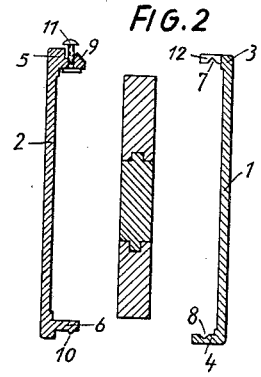
Fig. 2 shows an exploded cross-sectional view taken along line II—II of Fig. 1.
Figure 3:
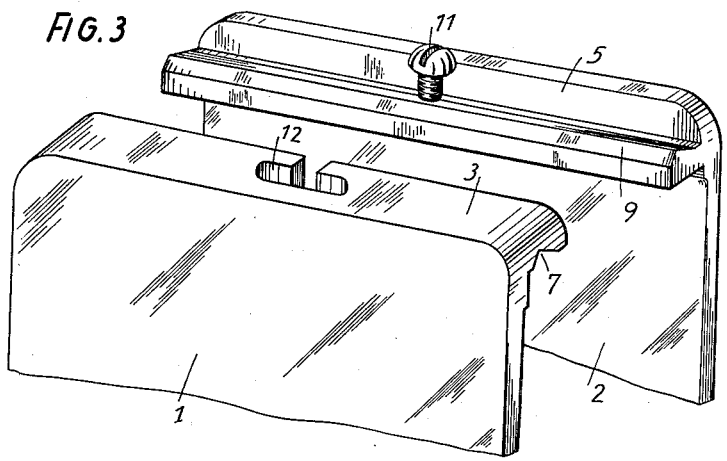
Fig. 3 shows an enlarged perspective view of the upper parts of the two slide brackets.

Referring to the drawings, and first particularly to Figs. 1 to 3 of the first embodiment of the invention, the slide consists of the two brackets 1 and 2, of which bracket 1 overlaps the other bracket 2 by engaging with its narrow upper and lower side walls 3 and 4 over the corresponding side walls 5 and 6 of the other brackets. Both brackets 1 and 2 consist of a suitable resilient material and are connected by a tongue-and-groove joint which consists of an upper groove 7 and a lower groove 8 in the side walls 7 and 8, respectively, of bracket 1, and an upper tongue 9 and a lower tongue 10 on side walls 5 and 6, respectively, of bracket 2. Both pairs of tongues and grooves preferably are of triangular shape in cross section, as shown in Fig. 2, and the relative size and shape thereof is such as to permit the overlapping grooved walls 3 and 4 of bracket 1 to engage resiliently over the side walls 5 and 6 of bracket 2, with grooved portions 7 and 8 snapping over the tongues 9 and 10, when the two brackets are pressed against each other.

Fig. 3 particularly illustrates the means for permitting the two brackets 1 and 2 to be shifted longitudinally relative to each other and to be secured to each other. A screw 11 is screwed from above into the narrow side wall 5 of bracket 2 so that its head is spaced a certain distance therefrom. The corresponding side wall 3 of bracket 1 has a T-shaped cutout 12, the central portion of which permits the insertion of the shaft of screw 11. Thus, after the two lower side walls 6 and 8 are engaged with each other when tongue 10 engaging in groove 8, the opposite sides of the brackets are pivoted toward each other and side wall 3 of bracket 1 is moved over side wall 5 of bracket 5, with the walls of groove 7 snapping over tongue 9 and the shaft portion of screw 11 slipping through the central portion of cutout 12 into the longitudinally slotted portion thereof. When in this position, the two brackets 1 and 2 are connected to each other but slidable relative to each other in the longitudinal direction within the limits of the longitudinal slot 12 to permit them to be adjusted in the proper position relative to each other, at which time the screw 11 is tightened to secure the two brackets in such adjusted position. If the slide is to be cleaned on the inside, it is merely necessary to loosen screw 11 slightly, whereupon, due to their resiliency, the two brackets can be snapped apart by inserting a knife or finger nail between the outer edge of side wall 3 and the projecting back portion 5' of the other bracket 2.

Figure 4:
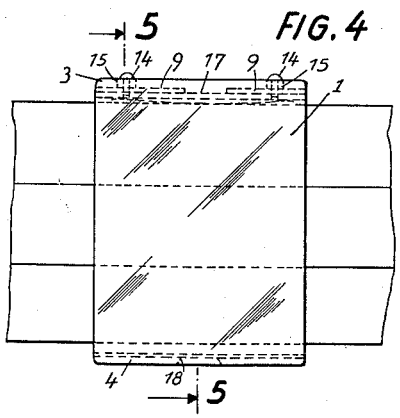
Fig. 4 shows a plan view of another embodiment of the invention.
Figure 5:
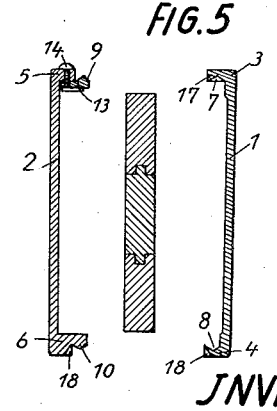
Fig. 5 shows an exploded cross section taken along line V—V of Fig. 4.
Figure 6:
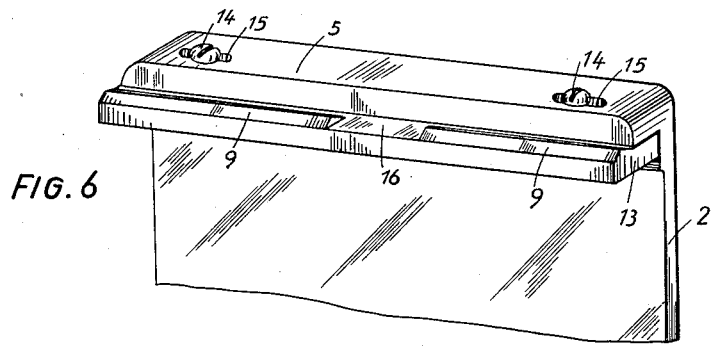
Fig. 6 shows an enlarged perspective view of the bracket according to Fig. 5 which is provided with a separate key.

In the modified embodiment of the invention as shown in Figs. 4 to 6, the two brackets 1 and 2 are likewise connected with each other by grooves 7 and 8 in the side walls or ledges 17 and 18, respectively, of bracket 1 and tongues 9 and 10 on side walls 13 and 13', respectively, of bracket 2. The upper side wall 13 with tongue 9 thereon forms a striplike element separate from the body of bracket 2 and is secured to the projecting flange 5 thereof by two screws 14. For this purpose, the holes in flange 5 for the passage of screws 14 are made in the form of elongated slots 15 so as to permit the strip 13 to be adjusted longitudinally relative to bracket 2. As shown in Fig. 6, tongue 9 on strip 13 is interrupted in the middle by a gap 16 in which a central projection 17' of similar size on the lower or inner side of side wall 17 of bracket 1 is adapted to engage so that bracket 2 will then be connected and locked to bracket 1, not only transversely by the tongue and groove connection, but also longitudinally by the projection 17' engaging in the gap 16.

If the two brackets 1 and 2 are to be adjusted relative to each other, the two screws 14 should be slightly loosened so that bracket 2 will then be slidable within the limits of slots 15 relative to strip 13 and bracket 1 which is rigidly connected therewith through the projection 17'. After the two parts 1 and 2 of the slide have been properly adjusted relatively to each other by means of the graduations thereon, screws 14 are again tightened. If the slide is to be cleaned on the inside and has to be removed for that purpose from the slide rule, it is only necessary to draw the two brackets 1 and 2 apart without loosening any of the screws. After the cleaning operation, the two brackets are again mounted on the slide rule by being pressed against each other and then snapping over each other due to their own resiliency. Since the relative position of the two brackets in the lateral direction is definitely fixed by the engagement of projection 17' on bracket 1 in gap 16 in strip 13, the adjustment of the brackets relative to the graduations of the slide rule, having once been set, will not be affected by such removal and remounting of the slide so that no further adjustment has to be made.

Figure 10:
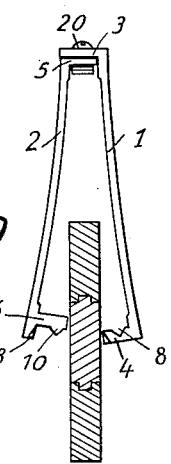
Fig. 10 shows a side view of the slide according to Fig. 7, while being slipped off the slide rule.

Another preferred embodiment of the invention is illustrated in Figs. 7 to 10, in which only the narrow lower side walls 4 and 6 of brackets 1 and 2, respectively, are provided with a tongue-and-groove joint 8, 10, while the upper side walls 3 and 5 are held together by two screws 20. This slide which is made of a suitable resilient plastic, such as, for example, methacrylic acid ester, may be bent apart at the tongue-and-groove side, as illustrated in Fig. 10, so as to be easily drawn upwardly from the slide rule without thereby affecting the adjustment of the graduations on brackets 1 and 2.

Figure 7:
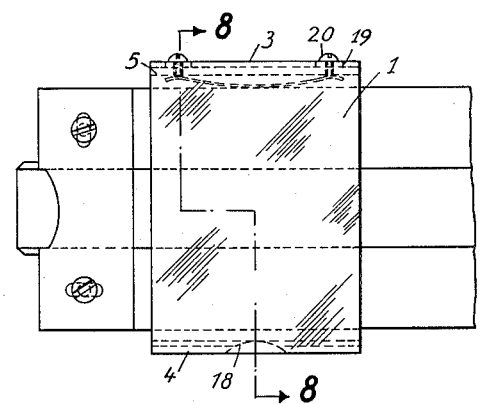
Fig. 7 shows a further embodiment of the invention, in which only one side of the brackets is provided with a tongue-and-groove joint.
Figure 8:
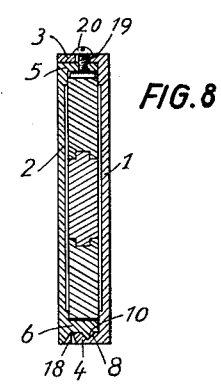
Fig. 8 shows a cross section taken along line VIII—VIII of Fig. 7.
Figure 9:
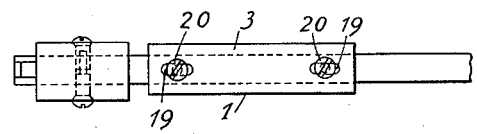

In order to facilitate the separation of brackets 1 and 2, the respective sides thereof which are either first, or alone, to be separated from each other, may also be provided with a suitable notch, such as notch 18 at the lower sides of the slide brackets as shown in Figs. 7 and 8, into which a suitable instrument, such as a knife blade or a fingernail may be inserted to exert a lever action upon the adjacent edges of the brackets to pry them apart.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In a double slide rule provided with a slide rule body, a slide member embracing said slide rule body transversely thereof including two U-shaped channel members having longitudinal flange portions disposed in interengaging and overlapping position with respect to each other, said flange portions lying adjacent one another defining opposite pairs of respective contact and guiding faces, at least one projection on one flange portion of one of said channel members and at least one longitudinal groove at the corresponding opposite flange portion of the other channel member engageable with each other to interlock at least one of said opposite pairs of contact and guiding faces, and connecting and adjusting means between said flange portions of said U-shaped channel members at least at one narrow side of said slide rule for securing said U-shaped channel members in their adjusted position to each other.

2. In a double slide rule provided with a slide rule body, a slide member embracing said slide rule body transversely thereof including two U-shaped channel members having longitudinal flange portions disposed in overlying relation to one another, said flange portions situated adjacent one another defining opposite pairs of respective contact and guiding faces, at least one projection on one flange portion of one of said channel members and at least one longitudinal groove in the corresponding opposite flange portion of the other channel member engageable with each other to interconnect at least one of said opposite pairs of contact and guiding faces, and at least one connecting head screw carried by one of the inner flange portions and having a shaft portion projecting outwardly with respect to said inner flange portion, and a longitudinally extending slot in the corresponding adjacent outer flange portion traversed by the shaft portion of said connecting screw at least at one narrow side of said slide rule for securing said U-shaped channel members in their adjusted positions to each other.

3. In a double slide rule provided with a slide rule body, a slide member embracing said slide rule body transversely thereof including a pair of diametrically opposed U-shaped channel members of resilient material having longitudinal flange portions disposed in overlying relation to one another, said flange portions lying adjacent each other defining opposite pairs of contact and guiding faces, at least one longitudinal projection of substantially triangular cross section on one flange portion of one of said channel members, and at least one longitudinal groove of similar cross-sectional shape and length as said projection and opposite thereto on the adjacent flange portion of the other channel member to interconnect at least one of said opposite pairs of contact and guiding faces, and connecting and adjustment means between adjacent flange portions of said U-shaped channel members at least at one narrow side of said slide rule for securing said U-shaped channel members in their adjusted position to each other.

4. In a double slide rule provided with a slide rule body, a slide member embracing said slide rule body transversely thereof and including two U-shaped channel members having longitudinal flange portions disposed in interengaging overlapping position, said flange portions lying adjacent one another defining opposite pairs of contact and guiding faces, at least two spaced longitudinal outwardly directed projections tandemly arranged on one flange portion of one of said two channel members, and at least two correspondingly spaced longitudinal grooves of similar cross-sectional shape and length as said outward projections and opposite thereto on the inside of the adjacent flange portion of the other channel member interconnecting with each other for adjustment and engagement of said U-shaped channel members to each other, at least one connecting head screw in one of the inner flange portions of one channel member, said screw having a shaft portion projecting outwardly from said inner flange portion, and a longitudinally extending slot in the corresponding adjacent outer flange portion of the other channel member traversed by the shaft portion of said connecting screw at least at one narrow side of said slide rule for securing said U-shaped channel members in their adjusted position to each other.

5. In a double slide rule provided with a slide rule body, a slide member embracing said slide rule body transversely thereof including two U-shaped channel members having longitudinal flange portions disposed in interengaging overlapping position with respect to each other, said flange portions disposed adjacent one another defining opposite pairs of contact and guiding faces, projection means on one flange portion of one of the two channel members and longitudinal grooves in the corresponding adjacent flange portion of the other channel member in interconnecting engagement with each other at least at one of said opposite pairs of contact and guide faces, at least one connecting head screw in one of the inner flange portions of one channel member and having a shaft portion projecting outwardly from said inner flange portion, the corresponding adjacent outer flange portion of the other channel member having at least one longitudinally extending slot therein, and a cutout extending from said slot towards the free edge of said outer flange portion, said cutout adapted to allow said shaft portion of said head screw to pass therethrough and into said slot for longitudinal adjustment of said channel portions relative to each other.

6. In a slide rule provided with a slide rule body, a slide member embracing said slide rule body transversely thereof and including two U-shaped channel members of resilient material having longitudinal flange portions overlying one another to define opposite pairs of contact and guiding faces between adjacent flange portions of different channel members, longitudinally disposed tongue-like projections at one flange portion of one channel member and longitudinal grooves of similar cross-sectional shape and length as said projections and opposite thereto in the corresponding adjacent flange portion interconnectable with each other at one of said opposite pairs of contact and guiding faces between said flange portions, a member adjustably secured to the inside of one of said flange portions, said member projecting from the latter transversely and having at least one longitudinal outward projection on its projecting part, at least one longitudinal groove of similar cross-sectional shape and length as said outward projection and opposite thereto on the inside of the adjacent other flange portion in interconnecting engagement with said outward projection of said member at the other of said pairs of contact and guiding faces between said flange portions.

7. In a slide rule cursor provided with a slide rule body, a slide member embracing said slide rule body transversely thereof including two U-shaped channel members of resilient material having longitudinal flange portions overlying each other, to define opposite pairs of contact and guiding faces between said channel portions, tongue-like projections at one flange portion, and longitudinal grooves of similar cross-sectional shape and length as said projections and opposite thereto on the corresponding opposite flange portion to interconnect one of said opposite pairs of contact and guiding faces of said flange portions, a separate member adjustably secured to the inside of one flange portion of one of said channel members, said separate member projecting from the latter transversely and having at least two spaced longitudinal outward projections positioned in longitudinal direction one after another on the projecting part of said separate member and two correspondingly spaced longitudinal grooves of similar cross-sectional shape and length as said outward projections and opposite thereto on the inside of the adjacent flange portion of the other channel member engageable with said outward projections of said separate member at the other of said pairs of contact and guiding faces of said flange portions.

8. In a slide rule according to claim 6, in which said member is adjustably secured to the inside of one of said flange portions by means of at least one longitudinal slot in said flange portion, and at least one corresponding head screw secured to said separate member and traversing said slot for securing said U-shaped channel members in their adjusted position to each other.

9. In a double slide rule provided with a slide rule body, a slide member embracing said slide rule body transversely thereof and including two U-shaped channel members of resilient material having longitudinal flange portions disposed in overlapping position with respect to each other to define opposite pairs of contact and guiding faces between adjacent flange portions of different channel members, at least one longitudinal projection on one flange portion of one of said two channel members, and at least one longitudinal groove of similar cross-sectional shape and length as said projection and opposite thereto on the adjacent flange portion of the other channel member engageable with said projection, and at least one notch at one of two opposite outer edges of two adjacent flange portions of different channel members for inserting an instrument when said resilient channel members have to be separated from each other.

References Cited in the file of this patent

UNITED STATES PATENTS

| | | |
|---|---|---|
| 1,181,672 | Keuffel | May 2, 1916 |
| 1,855,523 | Langsner | Apr. 26, 1932 |
| 1,930,852 | Keuffel | Oct. 17, 1933 |
| 2,407,338 | Kreiling | Sept. 10, 1946 |

FOREIGN PATENTS

| | | |
|---|---|---|
| 873,456 | Germany | Apr. 13, 1953 |
| 139,340 | Great Britain | Mar. 4, 1920 |